US008823770B2

(12) United States Patent
Brunner et al.

(10) Patent No.: US 8,823,770 B2
(45) Date of Patent: Sep. 2, 2014

(54) DEVICE AND METHODS FOR FABRICATING A TWO-DIMENSIONAL IMAGE OF A THREE-DIMENSIONAL OBJECT

(71) Applicant: Meditory LLC, Brighton, MI (US)

(72) Inventors: Alexander Brunner, Howell, MI (US); Sidney Trey Smith, Howell, MI (US); Randall Timothy Long, Brighton, MI (US)

(73) Assignee: Meditory LLC, Brighton, MI (US)

( * ) Notice: Subject to any disclaimer, the term of this patent is extended or adjusted under 35 U.S.C. 154(b) by 0 days.

(21) Appl. No.: 13/752,009

(22) Filed: Jan. 28, 2013

(65) Prior Publication Data

US 2013/0208084 A1 Aug. 15, 2013

Related U.S. Application Data

(60) Provisional application No. 61/590,976, filed on Jan. 26, 2012.

(51) Int. Cl.
*H04N 7/00* (2011.01)
*H04N 5/222* (2006.01)
*H04N 5/232* (2006.01)

(52) U.S. Cl.
CPC ........... *H04N 5/23238* (2013.01); *H04N 5/222* (2013.01)
USPC .............................................. 348/36; 348/37

(58) Field of Classification Search
None
See application file for complete search history.

(56) References Cited

U.S. PATENT DOCUMENTS

| | | | |
|---|---|---|---|
| 3,573,472 A | 4/1971 | Madalo |
| 3,955,179 A | 5/1976 | Planke |
| 4,042,960 A | 8/1977 | Wooding, Jr. |
| 4,055,834 A | 10/1977 | Planke |
| 4,244,650 A | 1/1981 | Garfunkel et al. |
| 4,414,566 A | 11/1983 | Peyton et al. |
| 4,563,739 A | 1/1986 | Gerpheide et al. |
| 4,656,510 A | 4/1987 | Mattila |
| 4,664,289 A | 5/1987 | Shimizu et al. |
| 4,885,461 A | 12/1989 | Mattila et al. |
| 5,028,769 A | 7/1991 | Claypool et al. |
| 5,072,108 A | 12/1991 | Ishikawa |
| 5,126,556 A | 6/1992 | Domenico et al. |

(Continued)

FOREIGN PATENT DOCUMENTS

WO 2009102616 A 8/2009
WO 2012046146 A 4/2012

*Primary Examiner* — Mehrdad Dastouri
*Assistant Examiner* — James Anderson, II
(74) *Attorney, Agent, or Firm* — Waters & Oppenhuizen PLC; David L. Oppenhuizen

(57) ABSTRACT

A device for acquiring two-dimensional images of a three-dimensional object including a housing having a receptacle for receiving the object. The receptacle has a floor and an interior sidewall. The sidewall has at least one sight window and a plurality of lights for illuminating the object. A rotatable turntable is positioned on the floor of the receptacle, and the object is positioned on the turntable. At least one camera having an iris is located within the housing and positioned so that the iris can obtain images of the object through the sight window, allowing the camera to obtain still images of the object as the object is rotated on the turntable. There is also provided methods for stitching the still images of the three-dimensional object into a two-dimensional image to facilitate optical character recognition and further data processing.

16 Claims, 4 Drawing Sheets

(56) References Cited

U.S. PATENT DOCUMENTS

| | | |
|---|---|---|
| 5,405,015 A | 4/1995 | Bhatia et al. |
| 5,426,282 A | 6/1995 | Humble |
| 6,049,379 A * | 4/2000 | Lucas .................. 356/240.1 |
| 6,912,293 B1 | 6/2005 | Korobkin |
| 7,224,822 B2 * | 5/2007 | Heacock .................. 382/117 |
| 7,490,773 B2 | 2/2009 | Mcvicker |
| 7,672,022 B1 * | 3/2010 | Fan .................. 358/474 |
| 7,995,831 B2 | 8/2011 | Eller et al. |
| 8,295,582 B2 | 10/2012 | Eller et al. |
| 2002/0012044 A1 | 1/2002 | Eccleshall |
| 2003/0011701 A1 | 1/2003 | Nilson et al. |
| 2006/0120752 A1 * | 6/2006 | McVicker et al. ............ 399/107 |
| 2007/0216687 A1 | 9/2007 | Kaasila et al. |
| 2008/0056556 A1 | 3/2008 | Eller et al. |
| 2009/0278925 A1 * | 11/2009 | Koval et al. .................. 348/92 |
| 2010/0121482 A1 * | 5/2010 | Jackson et al. ................ 700/217 |
| 2010/0265313 A1 * | 10/2010 | Liu et al. .................. 348/36 |
| 2011/0255791 A1 * | 10/2011 | Abdo et al. .................. 382/199 |
| 2011/0299757 A1 * | 12/2011 | Eller et al. .................. 382/142 |
| 2013/0307962 A1 * | 11/2013 | Humphries et al. ............ 348/86 |

* cited by examiner

DEVICE AND METHODS FOR FABRICATING A TWO-DIMENSIONAL IMAGE OF A THREE-DIMENSIONAL OBJECT

CROSS REFERENCE TO RELATED APPLICATION

This application claims the benefit of U.S. Provisional Application 61/590,976, which was filed on Jan. 26, 2012, the disclosure of which is hereby incorporated by reference.

BACKGROUND OF THE INVENTION

1. Field of the Invention

The present invention pertains to a device and methods for fabricating a two-dimensional image of a three-dimensional object. More particularly, the present invention pertains to a device and methods for obtaining two-dimensional images of three-dimensional objects, such as labels on prescription bottles and containers, as well as nutritional and drug labels on over-the-counter medicines and supplements.

2. Description of the Prior Art

Medical providers and home health agencies that monitor at-home patients are required to file a 100% accurate drug reconciliation and certification with Medicare upon admission of every new patient, and then a re-certification every 60 days in order for the patient to continue to receive Medicare reimbursements for home healthcare.

Currently, this is accomplished by sending the home care nurse to the patient's location and the nurse must gather all of the patient's pill bottles, boxes, and tubes, as well as all over-the-counter medications and vitamin bottles or boxes. It is also beneficial to collect any other supplements or nutritional additives that the patient may also be taking. For each container, the nurse must record the prescription number, the number of pills, the number of refills remaining, dosage instructions, the prescribing doctor's name and phone number, the pharmacy name and phone number, and so on. Currently, this is accomplished in the field by either writing all of this information down on paper, or typing it into a computer. In the vast majority of instances, the nurse records this information by hand writing it down because a computer is either not available or the nurse is more familiar and comfortable with writing the information by hand. Regardless of whether the information is written by hand or typed into a laptop computer, there is room for error and it is a time-consuming activity. This intake procedure can easily take from 30 to 60 minutes, depending upon the number of containers.

The information is then collected by the nurse and typed into the home health agency's computer system, which takes additional time and also allows a second opportunity for human error to occur. For example, errors can occur when the nurse has clearly written down the information correctly but the data is then typed incorrectly into the computer system.

It is apparent that this manual intake procedure is an inefficient use of the nurse's time, and that the nurse could reduce the length of the visit and also increase the amount of time spent conversing with the patient about the patient's health if a more efficient method of recording the prescription information was available.

But even more so, this manual data intake method often leads to mistakes. For instance, English is a second language to many nurses, and they may have different ways of writing various letters that render their handwriting illegible or difficult to read. Compounding this problem is the fact that many drug names are similar to each other. In addition, nurses may be rushed to complete the job if they are running behind, or may even fail to record some prescriptions that they assess as being unimportant because they are short on time. They may also fail to record all of the information for each prescription. Furthermore, the nurses working in the field routinely encounter a variety of distractions which lead to errors, including rambunctious children, loud pets, loud televisions, distracting adults, etc.

As mentioned above, there is a second opportunity for error to occur when the nurse's notes are entered as data into the computer system. Errors can result from not being able to understand the handwriting, or simply from mistyping information that was correctly and legibly written down. In cases where the handwriting is too difficult to understand or information is simply missing, it is necessary to track this information down by calling the nurse, the doctor's office, or the pharmacy to confirm the handwritten information or to obtain the omitted information. Once again, this requires time and it can often require repeated phone calls before the information is confirmed or obtained.

Therefore, it is obvious that an improved system is needed which can save the home health agency both time and money, ensure patient safety by recording the correct drugs, and free up some of the nurse's time so that he or she can spend more time conversing with the patient about his or her health concerns rather than performing data entry.

The present invention, as is detailed hereinbelow, seeks to fill this need by providing a device and method for automatically fabricating a two-dimensional image of a three-dimensional object, such as a pill bottle.

SUMMARY OF THE INVENTION

The invention, as described hereinbelow, is a device, or apparatus for automatically obtaining images of a three-dimensional object. More specifically, the device is portable and has a housing including a receptacle for receiving the prescription bottles, boxes etc. The device includes a rotatable turntable upon which the object is placed and rotated. A camera is located within the housing and obtains images of the object as it is rotated. These series of images are then stitched into a single cohesive two-dimensional image upon which optical character recognition (OCR) can be performed, and the digitized information can then be verified using computerized processes and/or by manual inspection.

In other aspects, the invention includes several methods for stitching the plurality of obtained images into a single two-dimensional image of the label on the bottle, box, etc.

The present invention provides a device for acquiring a two-dimensional image of a three-dimensional object comprising:

(a) a housing having a receptacle for receiving the object, the receptacle having a floor and an interior sidewall, the sidewall having at least one sight window;

(b) a plurality of lights for illuminating the object;

(c) a rotatable turntable positioned on the floor of the receptacle, and the object being positioned on the turntable; and (d) at least one camera having an iris located within the housing, the camera being positioned so that the iris can obtain images of the object through the sight window;

(e) whereby the camera obtains still images of the object as the object is rotated on the turntable.

Optionally, the lights are oriented to provide indirect lighting to the object. Optionally, the sidewall of the receptacle includes a backdrop portion positioned opposite the camera and behind the object as viewed by the camera. The backdrop portion is specifically colored to contrast with the object, and in particular, the backdrop portion is preferably yellow. And optionally, there is provided means for moving the camera up and down.

In another aspect hereof, the present invention includes a sectional method for acquiring a two-dimensional image of a three-dimensional object including the steps of:

(a) providing a camera for obtaining images of the object;
(b) calculating the width of the object;
(c) determining the width of an image stripe based upon the width of the object;
(d) capturing a first image stripe of the object;
(e) rotating the object to a second position;
(f) capturing a second image stripe of the object; and
(g) stitching together the first and second image strips of the object to form the two-dimensional image.

Optionally, this method can include the steps of: (h) capturing a third image stripe of the object at a third rotational position; (i) capturing a fourth image stripe of the object at a fourth rotational position; and (j) stitching third and fourth image stripes together along with the first and second image stripes to form the two-dimensional image.

Preferably, the object is rotated about 30° from the first position to the second position, thereby rotating the object thirteen times to twelve unique positions (the first and last positions being the same) before the object has been completed rotated. Thus, the entire method can include capturing thirteen images at the twelve positions.

Optionally, the width of the object is calculated by determining the location of a left edge and a right edge of the object. The left edge is located by comparing the contrast level of pixels in a first plurality of pixels in a row from left to right until a pixel is located having a contrast level that is different than that of the pixels already compared in the first plurality of pixels. A threshold contrast setting may be established or defined by being manually selected by a user, built into the software code performing the method, or the like.

Optionally, the width of the object is calculated by determining the location of a left edge and a right edge of the object by analyzing pixels in a horizontal row of pixels across the image.

The left edge is located by designating a first pixel known to be to the left of the object as a subject pixel, and designating a plurality of pixels positioned to the left of the subject pixel as reference pixels, comparing at least one pixel property of the subject pixel with the pixel property of the reference pixels, determining that the left edge of the image is not located at the subject pixel when the subject pixel and the reference pixel have the same pixel property, determining that the left edge of the image does begin at the subject pixel when the subject pixel and the reference pixels do not have the same pixel property, and when the subject pixel is determined as not being the left edge of the image, a second pixel to the right of the first pixel is then designated as the subject pixel, and the process of comparing the pixel property between the reference pixels and the subject pixel is repeated, wherein the process of comparing the pixel property and the subsequent re-designation of the subject pixel and reference pixels is repeated until the left edge of the image is located.

The right edge is located in the same manner by designating a first pixel known to be to the right of the object as a subject pixel, and designating a plurality of pixels positioned to the right of the subject pixel as reference pixels, comparing at least one pixel property of the subject pixel with the pixel property of the reference pixels, determining that the right edge of the image is not located at the subject pixel when the subject pixel and the reference pixel have the same pixel property, determining that the right edge of the image does begin at the subject pixel when the subject pixel and the reference pixels do not have the same pixel property, and when the subject pixel is determined as not being the right edge of the image, a second pixel to the left of the first pixel is then designated as the subject pixel, and the process of comparing the pixel property between the reference pixels and the subject pixel is repeated, wherein the process of comparing the pixel property and the subsequent re-designation of the subject pixel and the reference pixels is repeated until the right edge of the image is located, and the width of the object is then determined once the left and right edges have been located. The reference pixels include at least 10 pixels, and preferably, about 35 pixels.

Described differently, the right edge is located by comparing the contrast level of pixels in a second plurality of pixels in a row from right to left until a pixel is located having a contrast level that is different than that of the pixels already compared in the second plurality of pixels, the width of the object being calculated as a distance between the left edge and the right edge. The first and second pluralities of pixels each comprise at least 10 pixels in a row, and preferably, about 36 pixels (comparing the current pixel to the previous 35).

Optionally, there is also provided the step of calculating the center of the object using the known locations of the left and right edges, and providing a visual indicator alerting a user if the object is off-center. The visual indicator can include a green bar that displays the calculated width when the object is adequately centered, a yellow bar displaying the calculated width when the object is marginally off-centered, and a red bar displaying the calculated width when the object is critically off-centered. The visual indicator allows the user to re-position the object before the scanning, or image acquisition process, begins, thereby alerting the user before an image of poor quality is obtained.

Furthermore, the method can also include the step of determining a left edge of the two-dimensional image either by using known pixel characteristics or by manual selection by a user.

According to the present invention, there is disclosed a rotary method for acquiring a two-dimensional image file of a three-dimensional object including the steps of:

(a) providing a camera for obtaining images of the object;
(b) rotating the object;
(c) obtaining a plurality of image stripes of the object by the camera as the object rotates, the image stripes comprising a plurality of pixel columns;
(d) applying a digital fingerprint to the pixel columns, the digital fingerprint including at least one of the following items of information: (i) the quantity of black pixels in the respective pixel column; (ii) a coordinate position of the black pixels in the respective pixel column; (iii) the quantity of white pixels in the respective pixel column; (iv) a coordinate position of the white pixels in the respective pixel column; (v) the quantity of pixels that are neither black nor white in the respective pixel column; or (vi) a coordinate position of the pixels that are neither black nor white in the respective pixel column;
(e) comparing the digital fingerprints of the pixel columns in adjacent image stripes to identify redundant pixel columns; and
(f) compiling the images stripes, without the redundant pixel columns, into the two-dimensional image file.

Optionally, this rotary method can also include the steps of arranging the image stripes in an array, and deleting any duplicate image stripes.

Just as with the sectional method described above, this rotary method can optionally include the steps of calculating the width of the object and determining the width of the image stripes based upon the width of the object. According to this method, the width of each of the image stripes is preferably about 4 to about 20 pixels wide, which is much narrower than the width of the image stripes obtained in the sectional method above.

Optionally, this method can also include the step of calculating the center of the object by determining the locations of the left and right edges of the object at at least two different rotational positions, and providing a visual indicator alerting a user if the object is off-center. Preferably, the locations of the left and right edges are determined at three different rotational positions, each preferably being rotated 90° from each other.

Furthermore, the present invention includes a method of applying a digital fingerprint to a pixel column in a digital image including the steps of: (a) assigning a unique "x" coordinate to the pixel column; and (b) quantifying the number of black pixels, white pixels, and pixels that are neither black nor white in the pixel column. The method of applying a digital fingerprint can further optionally include the step of assigning a unique "y" coordinate to the black pixels, white pixels, and pixels that are neither black nor white in the pixel column.

In addition, there is provided a method of acquiring and comparing a first two-dimensional image and a second two-dimensional image of a three-dimensional object comprising: (a) providing a camera for obtaining images of the object; (b) rotating the object; (c) obtaining a plurality of images of the object while the object is at various rotational positions; (d) stitching together the plurality of images to form the first two-dimensional image; and (e) abutting at least 2 of the images from the plurality of images next to each other to form a second two-dimensional image. Preferably, the second two-dimensional image includes six images from the plurality of images.

For a more complete understanding of the present invention, reference is made to the following detailed description and accompanying drawings. In the drawings, like reference characters refer to like parts throughout the views in which:

DETAILED DESCRIPTION OF THE PREFERRED EMBODIMENT

Figure 1:
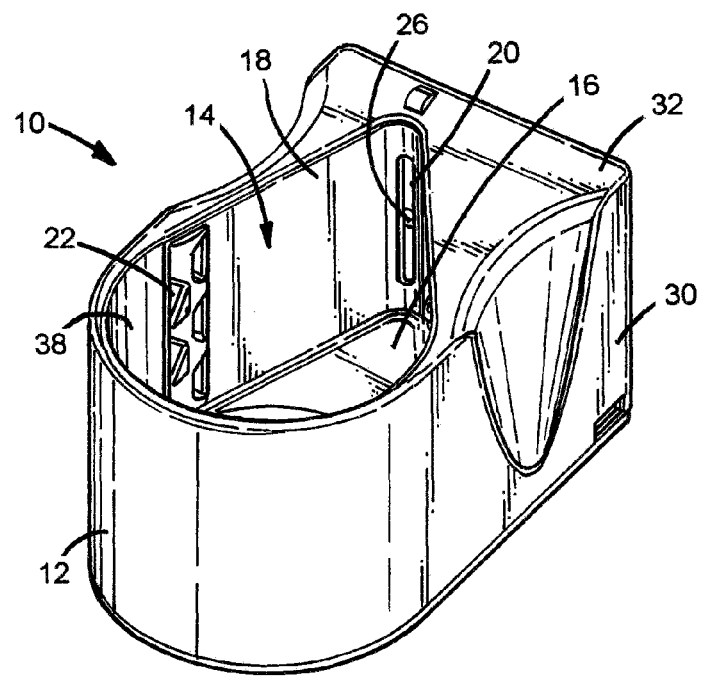
FIG. 1 is a first perspective view of an embodiment of the image acquisition device hereof.
Figure 2:
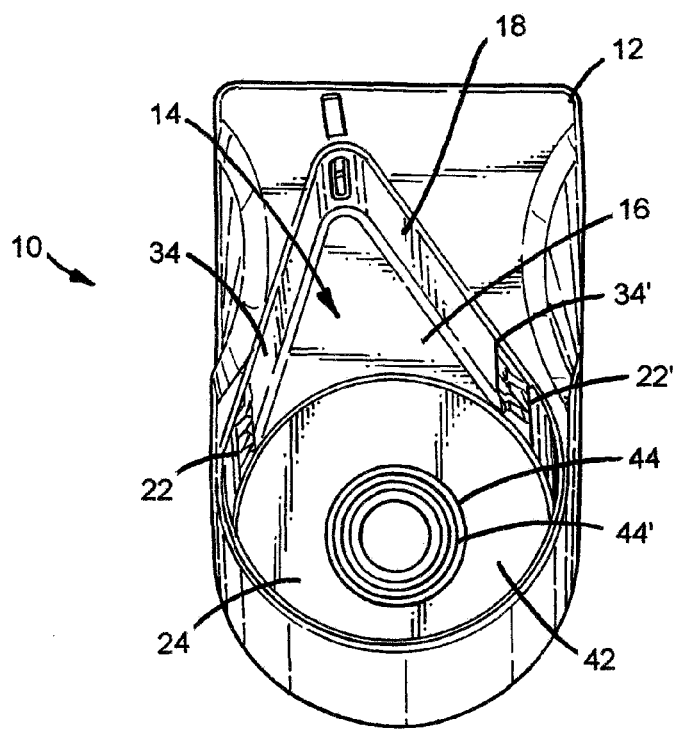
FIG. 2 is a second perspective view of an embodiment of the image acquisition device hereof.
Figure 3:
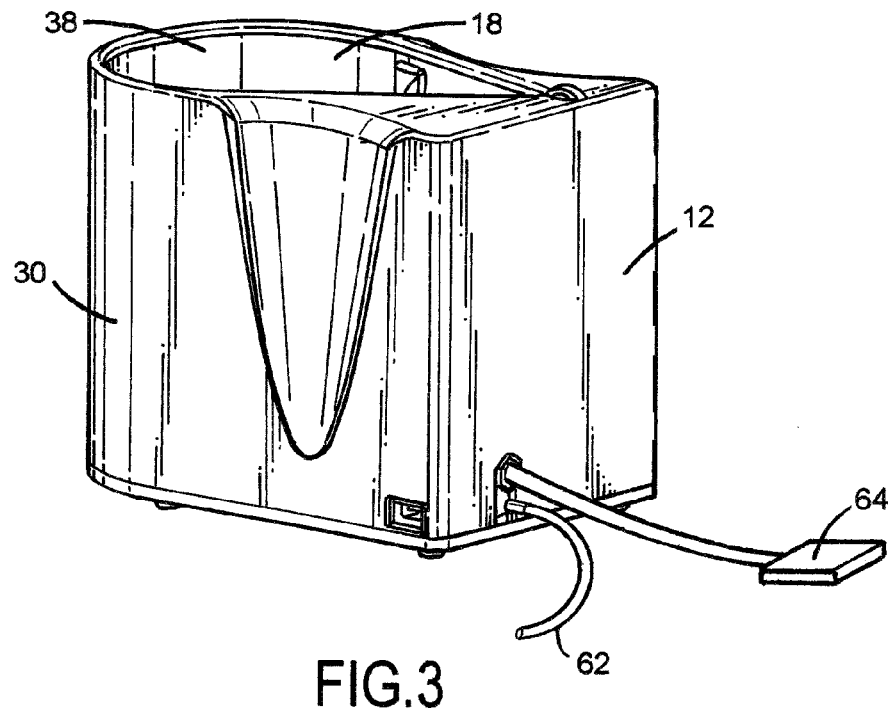
FIG. 3 is a third perspective view of an embodiment of the image acquisition device hereof.

In accordance with the present invention and as shown generally in FIGS. 1-3, there is provided an image acquisition device 10 for acquiring a two-dimensional image of a three-dimensional object comprising: (a) a housing 12 having a receptacle 14 for receiving the object O, the receptacle 14 having a floor 16 and an interior sidewall 18, the interior sidewall 18 having at least one sight window 20; (b) a plurality of lights 22,22', etc. for illuminating the object; (c) a rotatable turntable 24 positioned on the floor 16 of the receptacle 14, the object being positioned on the turntable 24; and (d) at least one camera 26 having an iris 28 located within the housing 12, the camera 26 being positioned so that the iris 28 can obtain images of the object through the sight window 20; whereby the camera 26 obtains still images of the object as the object is rotated on the turntable 24.

The image acquisition device 10 is portable and preferably small enough that it is suitable for tabletop use, allowing it to be transported by the nurse from the location of one patient to another. The image acquisition device 10 includes a housing 12 for containing the various components of the device. The housing 12 is formed from any suitable material, including plastic, metal, or the like. Preferably it is formed from a plastic material which allows the housing 12 to be manufactured using any suitable technique, such as injection molding.

The housing 12 includes at least one exterior sidewall 30, at least one interior sidewall 18, a top surface 32, and a floor 16. The interior sidewall 18 cooperates with the floor 16 to form a receptacle 14 for receiving the prescription pill, bottle, tube, etc. (hereinafter the "object" or "container").

Preferably the receptacle 14 has an open top which allows the nurse to easily insert or remove each container, thereby accelerating the entire prescription drug intake process. However, optionally the receptacle 14 can have a lid (not shown). Preferably the receptacle 14 has a tear-shaped cross-section so that camera 26 can be positioned further away from the object, thereby increasing the camera's field of sight.

The floor 16 functions as a base or support for many of the internal components of the image acquisition device 10. The floor 16 is preferably a separate piece from the interior and exterior sidewalls, 18 and 30, allowing the floor 16 to be removed from the remainder of the housing 12 to allow access to the internal components for service, assembly, or the like.

Figure 4:
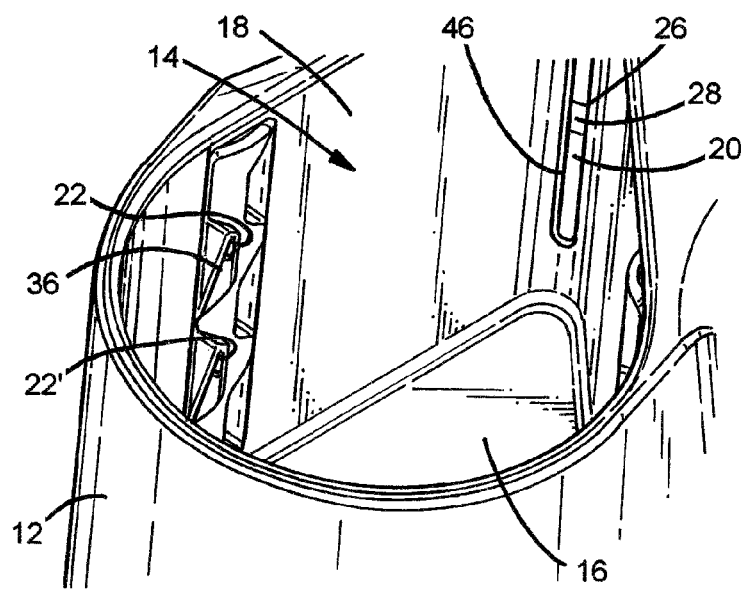
FIG. 4 is an enlarged view showing the receptacle in the device and the lights and the sight window in greater detail.

The device includes a plurality of lights 22,22', etc. for illuminating the object. Consistent illumination of the object is important to obtain quality images. As shown throughout the drawings, the plurality of lights 22,22', etc. are preferably positioned within the receptacle 14 and on the interior sidewall 18 of the housing 12. As shown, the lights are preferably positioned on each side 34,34' of the receptacle 14, and the lights 22,22', etc. on each side 34,34' are also preferably directed in multiple directions, thereby providing adequate illumination within the receptacle 14 and to the object. As shown in FIG. 4, the lights 22,22', etc. also are preferably shielded from directly illuminating the object because direct illumination can cause glare and other issues. Therefore, the lights 22,22', etc. are positioned within a shielded recess 36 in order to indirectly illuminate the object. The lights 22,22', etc. can comprise any suitable type of light that is well-known in the art, and which preferably provide a high level of illumination, a long-lasting life, and low power-usage. Although any type of light which achieves these desirable characteristics can be used, the light 22,22', etc. is preferably a light emitting diode, or LED.

There is also provided a backdrop portion 38 of the interior sidewall 18 that is positioned opposite the camera 26 and behind the object as viewed by the camera 26. The backdrop portion 38 has properties which facilitate identifying the left edge LE and the right edge RE of the object, such as providing good contrast with the color of the containers. The backdrop portion 38 has a non-reflective finish and is appropriately colored. Preferably, the backdrop portion 38 is colored yellow.

There is also a rotatable turntable 24 positioned on the floor 16 within the receptacle 14. The object is positioned upon the rotatable turntable 24 to rotate the object for capturing the various images. The rotatable turntable 24 comprises a motor 40 which rotates a pad 42. The pad 42 can be formed from any suitable type of material, including plastic, metal, or the like. Preferably the pad 42 has a finish that provides adequate grip to the object so that the object does not slip or move during rotation. Preferably, the pad 42 is formed from an elastomeric material that provides a rubber-like finish to grip the object.

The pad 42 can include a plurality of concentric recesses 44, or circles, to assist the user in placing the object on-center. In some geographic locations it is common to find containers having an irregular shape, and therefore the pad 42 can include recesses 44,44', etc. having any suitable type of geometry. For example, in Florida it is common to find prescription containers that have a cross-sectional area comprising a triangle-like polygon having arched sides, much like a Reuleaux triangle. In order to accommodate a variety of different recess geometries, the pad 42 can have unique recesses 44,44', etc. on each side, and the pad 42 can be removable so that it can be flipped from one side to the other as desired by the user.

The motor 40 comprises any suitable type of electric motor that is small and lightweight. Preferably the motor 40 is a stepper motor, which is known to those having ordinary skill in the art as being a DC electric motor that divides a full rotation into a number of equal steps.

The image acquisition device 10 also includes at least one camera 26 having an iris 28 located within the housing 12. The camera 26 is preferably self-focusing and can also preferably adjust other settings such as aperture, shutter speed, etc. The camera 26 is also preferably one which can capture both still images and video, and also possibly pull (or obtain) still images from video. Cameras 26 that are used with cell phones are very suitable because they match the requirements mentioned above, and are also lightweight and require low power usage. Specifically, the e-CAM33_USB made by Omnivision can be used herewith.

The interior sidewall 18 in the receptacle 14 has a sight window 20 through which the iris 28 of the camera 26 can obtain still images of the object as the object is rotated on the turntable 24. The sight window 20 can comprise a small opening. However, the sight window 20 can also comprise a vertical slot 46 which allows the camera 26 to be moved up and down within the housing 12 as required by the user.

Figure 5:
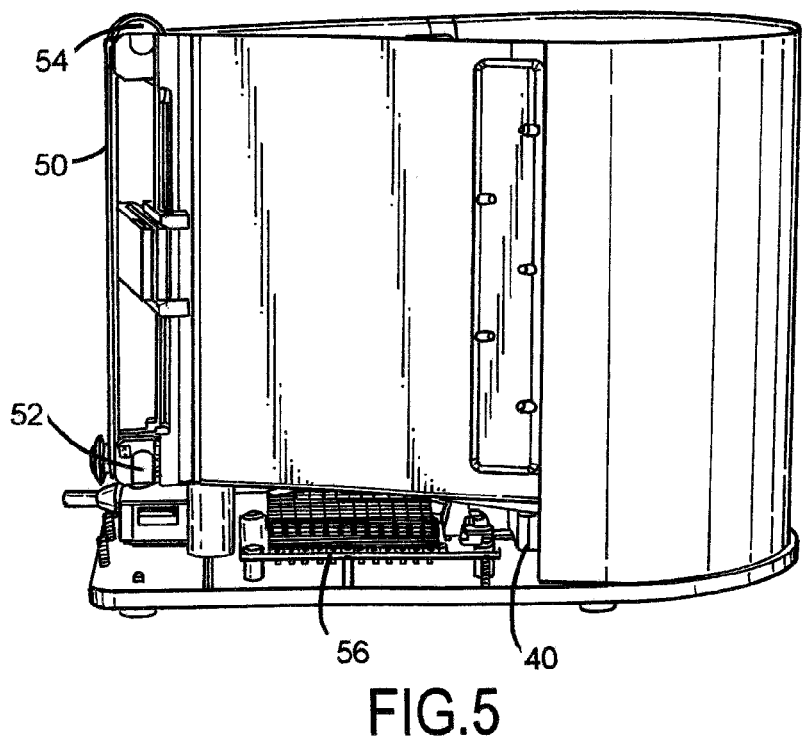
FIG. 5 is a perspective view of an embodiment of the image acquisition device with the housing partially removed to show the inner components.
Figure 6:
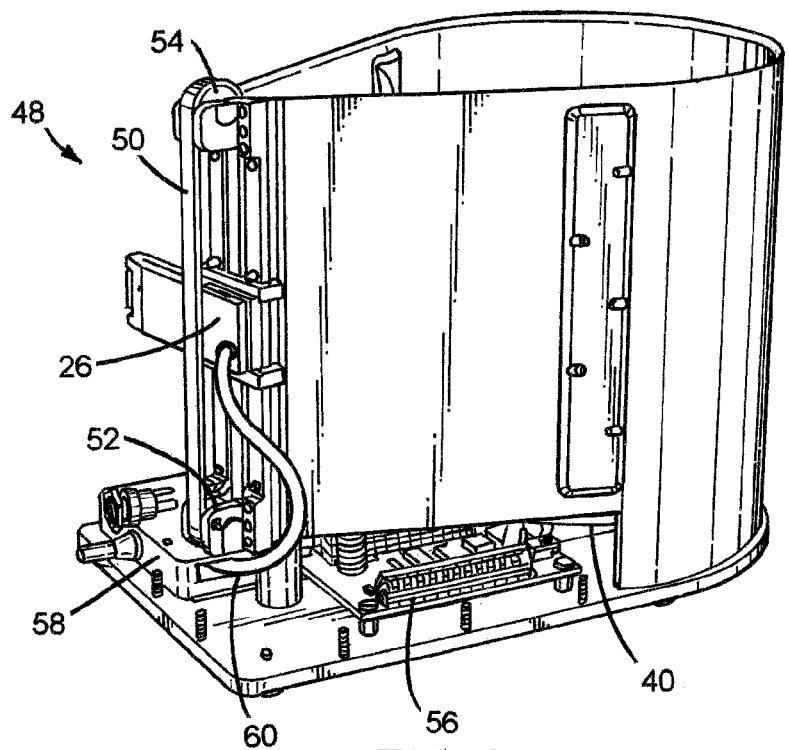
FIG. 6 is another perspective view of an embodiment of the image acquisition device with the housing partially removed to show the inner components, and in particular, showing the means for moving the camera up and down.

There is also provided means for moving 48 the camera 26 up and down. It is apparent that the containers will come in a wide variety of shapes and sizes, and it is desirable to allow the camera 26 to be moved up or down as necessary in order to label on the container. The means for moving 48 the camera 26 up and down can comprise any suitable type of mechanism. For example, and as shown in FIGS. 5 and 6, the means 48 can include a belt 50 that is looped around a bottom cogwheel 52 and an upper cogwheel 54. The camera 26 is secured to the belt 50 such that turning the belt 50 and cogwheels 52,54 will move the camera 26 up or down. As shown, the upper cogwheel 54 extends partially through the top surface 32 of the housing 12 allowing a user to move the camera 26 up or down by manually rotating the upper cogwheel 54. Although not shown in the drawings, the means for moving 48 the camera 26 up and down can also include the camera 26 attached to a block that rides up and down a worm gear, a camera 26 attached to and elongated rod that can extend out of the housing 12 and can be moved up and down manually, or the like. The means for moving 48 the camera 26 up and down can be manually powered by the user or electrically powered.

Optionally, a second camera (not shown) can be provided which may or may not be detachable from the housing 12 or manually manipulated by the user.

The device 10 also includes the requisite electrical connectors and a controller 56 to operate and control the motor 40 and camera 26. A USB connector 58, or hub, is provided to connect the image acquisition device 10 to a computer (not shown) that operates software which interacts with, and controls, the operation of the image acquisition device 10. The camera 26 has a USB cord 60 that connects into the USB connector 58, which in turn is connected to the computer by another USB cord 62. The controller 56 is connected to both the USB connector 58 and the motor 40 to control operation of the motor 40.

A power source for the image acquisition device 10 is also provided. The power source 64 can comprise a set of batteries, a rechargeable battery pack, an electric plug, or the like. If an AC power source is provided, there can also be provided any suitable means for converting the power, such as providing a rectifier to convert AC to DC.

Optionally, the device can include a card holder (not shown) that can hold a card, such as an identification card like a Medicare card, so that the card can be viewed by the camera 26. The card holder preferably has walls that geometrically complement the interior sidewall 18 so that the card holder can be securely held in position within the receptacle 14. Associating each patient to his or her prescription information is paramount, and this information also needs to be recorded by the nurse. Therefore, by providing the card holder, the nurse is able to insert the patient's Medicare card into the card holder, place the card holder into the receptacle 14, and obtain an image of the patient's card for future reference. It is apparent that recording this information in this manner has the same benefits as recording the label information from the containers.

Using the image acquisition device 10, it is now seen that the image acquisition device 10 can be used to quickly, easily, and automatically obtain still images of the container. The nurse only needs to place the first container into the device, verify that the container is positioned on-center and verify that the camera 26 is in focus, and then begin the image acquisition process using the software operating in the computer. The device 10 will then automatically rotate the container and obtain a number of still images about the container. These still images are then sent back to the computer for processing by the software. The nurse then removes the object from the receptacle 14, places a second object into the receptacle 14, and starts the process again. Each image acquisition cycle can last 15 seconds or less, which is much shorter than having the nurse manually record the data.

There is also provided another device and method for obtaining the two-dimensional image of the three-dimensional object. According to this device and method, the user uses the camera in his or her phone to obtain the images of the object. The user simply holds the object in front of the camera while the camera obtains the images, such as grabbing still images from video. The user rotates the object around so that the camera can view all necessary angles of the object. There is provided a smartphone application that operates in the phone that not only controls the image acquisition process, but that uses the various still images that are obtained and stitches them into a single two-dimensional image of the label about the three-dimensional object.

Various methods for processing these numerous images into a single cohesive two-dimensional image are described in greater detail below. For instance, there is provided a first method, or a sectional method, for acquiring a two-dimensional image of a three-dimensional object including the steps of: (a) providing a camera 26 for obtaining images of the object; (b) calculating the width of the object; (c) determining the width of an image stripe based upon the width of the object; (d) capturing a first image stripe 66 of the object; (e) rotating the object to a second position; (f) capturing a second image stripe of the object; and (g) stitching together the first and second image stripes 66 of the object to form the two-dimensional image.

The width of the object can be calculated using any suitable methods that are well-known in the machine vision arts. A typical method is performed by assigning threshold contrast or coloration values to pixels to determine, for example, what is defined as a yellow pixel and an amber pixel, or a "light" pixel and a "dark" pixel. Then, the image is processed by the software to determine the left edge and the right edge by identifying, for example, where the pixels change from yellow to amber and then back to yellow again, or where the pixels change from light to dark and then back to light again. The locations where these transitions occur are then identified as the left edge and the right edge of the object.

Although this method can be suitable for locating the left and right edges, LE and RE, it is prone to falsely identifying the edge location because of less-than-perfect conditions such as dust and graphical issues. Therefore, an improved method for locating the left and right edges has been developed.

According to this method, the left edge LE is located by comparing the contrast level of pixels in a first plurality of pixels in a row 68 from left to right until a pixel is located having a contrast level that is different than that of the pixels already compared in the first plurality of pixels. If the left edge LE is not located, then the first plurality of pixels is shifted to the right and the comparison is performed again. The right edge RE is also located by comparing the contrast level of pixels in a second plurality of pixels in a row from right to left until a pixel is located having a contrast level that is different than that of the pixels already compared in the second plurality of pixels. The width of the object is then calculated as a distance between the left edge and the right edge. Preferably, the first and second pluralities of pixels each comprise at least ten pixels in a row.

In other words, the image includes a horizontal row of pixels extending from the left edge of the image to the right edge. Then, working inward toward the center of the image from the outer edges, each pixel in the horizontal row is compared to at least a number of the pixels positioned outward from the pixel that is being analyzed.

Figure 8:
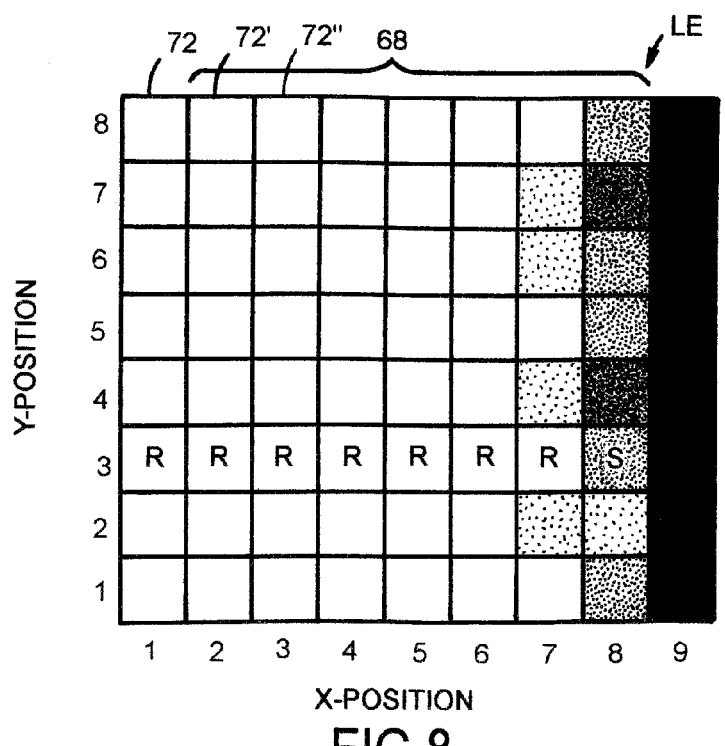
FIG. 8 is a sample enlarged display of pixels to help depict the method for locating an edge of the container described herein.

Described in yet another way, and as shown in FIG. 8, each pixel in the horizontal row can be thought of as having a unique "x" position along the row. The pixel being compared, or the subject pixel S at x-position number 8 is compared to those reference pixels R in positions 1 through 7. If the subject pixel S at position number 8 has properties that substantially match those reference pixels in positions 1 through 7, then it is determined that the left edge of the container is not located at the subject pixel number 8. Pixel number 9 is then designated as the subject pixel S compared to the reference pixels R in positions 2 through 8. This process is repeated from left-to-right, and from right-to-left to determine the left edge and right edge of the object, respectively. The subject pixel S being compared and the reference pixels R are shifted over for each comparison analysis.

The number of reference pixels R, that is, the pixels against which the subject pixel S is being compared, can be any suitable number. It is known that a minimum number of reference pixels R should be used to ensure accurate results, yet there is a point of diminishing returns that results in wasted computing resources if too many reference pixels R are used. Preferably, the number of reference pixels R is about ten or more. Even more preferably, the number of reference pixels R is about 35.

Figure 7:
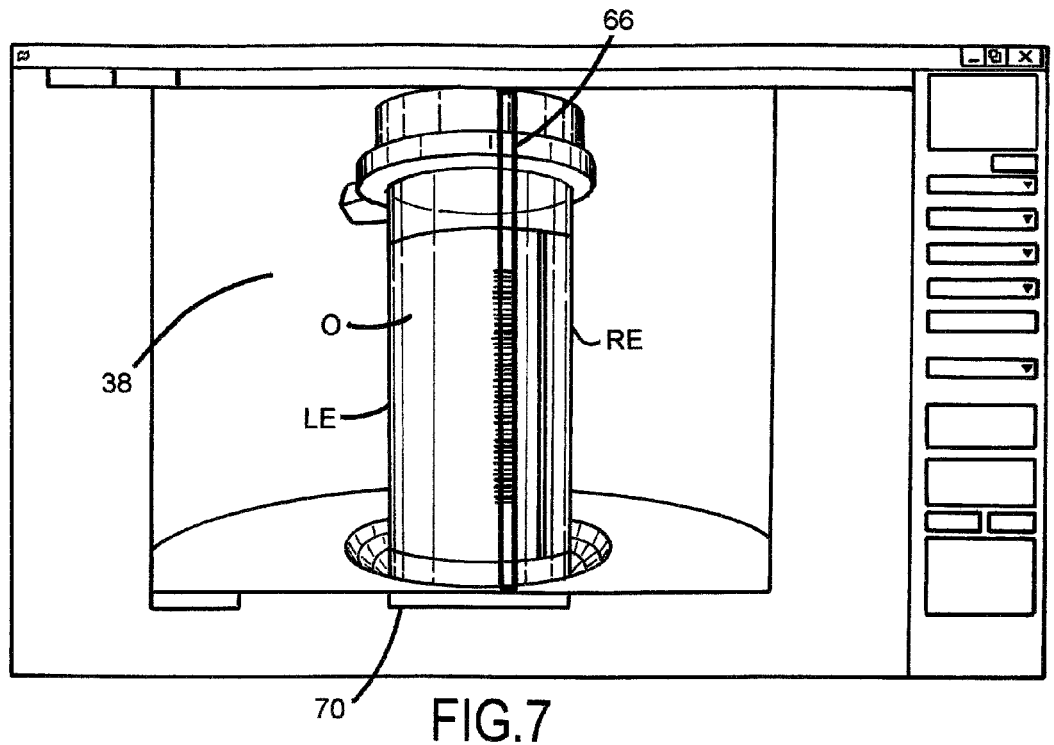
FIG. 7 is a screenshot view of a computer operating software interfacing with the image acquisition device showing the width indicator.

The next step includes determining the width of an image stripe based upon the width of the object. As referenced throughout, and as shown in FIG. 7, the image stripe 66 is a vertical strip from the top of the object to the bottom of the object, and it has a width that can vary depending upon the width of the object itself. When obtaining images on a three-dimensional surface, and in particular a cylindrical object, it is to be understood that the image is not distorted at the center point of alignment with the camera 26. But moving outward toward each curved side, the prescription label and its text begins to become distorted as it wraps around the side of the container. The wider the object, the wider area of minimal distortion in the center of the object. Therefore, the width of the image stripe 66 is selected as a function of the width of the object with the overall purpose of minimizing distortion of the prescription label near the sides.

Next, the sectional method entails capturing a first image stripe of the object, rotating the object to a second position, capturing a second image stripe of the object, and so forth until all of the desired images are captured. In instances where the location of the label on the container is not known, or where the label wraps entirely around the container, it is desirable to obtain images, or capture the image stripe, around the entire object. In one particular setting, the object is rotated in the 30° increments until the object is completely rotated. In this instance, thirteen image stripes may be captured of the object, the first and last being from the same rotational position.

Once the multitude of image stripes is collected, the last step in this method involves stitching together the collected image strips of the object to form a two-dimensional image of the label that envelops the three-dimensional object. Any suitable method for stitching images that is well-known in the art can be used. Alternatively, this step can simply entail butting the processed image stripes against each other in their assigned order since the preceding steps have already prepared the images for being butted together.

In yet another aspect hereof, there is provided a method for displaying an indicator for instructing a user when the object is off-centered on the turntable 24. First, the center of the object is calculated once the location of the left edge and the right edge have been determined using any of the methods described above. The location of the left edge and the location of the right edge may optionally be determined at more than one rotational position on the turntable 24 to ensure accurate results. As shown in FIG. 7, a visual indicator 70 is provided which displays the calculated width of the object. The visual indicator 70 is a bar that visually shows the calculated width across the object to verify that the width has been calculated accurately. When the object is centered, the indicator 70 is displayed as green, when the object is marginally off-centered the indicator 70 is displayed as yellow, and the indicator 70 is displayed as red when the object is critically off-centered. By providing this metered indicator 70 to the user, the user can verify that the width of the object has been calculated accurately and the user is also given an opportunity to adjust the position of the object if necessary before time is wasted obtaining images of an off-centered object.

In yet another aspect hereof, the left edge of the label on the object can be determined by either using known pixel characteristics or manual selection by a user. When the label does not entirely encircle the object and there is an optical break between the object and the label, it is straightforward for the software to determine the left edge of the label. However, it is very common that a label will entirely encircle the object, or that additional labels will also be placed on the object. These additional labels cooperate with the prescription label to entirely encircle the object as well. In these cases, the left edge of the label can be manually selected by the user once the two-dimensional image has been produced. Then the two-dimensional image will be re-cropped around the selected edge so that the label will be properly displayed.

In another aspect hereof, there is disclosed a method (which may be referenced hereinafter as a "rotary method" or "rotary scanning") for acquiring a two-dimensional image file of a three-dimensional object including the steps of: (a) providing the camera 26 for obtaining images of the object; (b) rotating the object; (c) obtaining a plurality of image stripes 66 of the object by the camera 26 as the object rotates, the image stripes 66 comprising a plurality of pixel columns 72,72',72", etc.; (d) arranging the image stripes in an array; (e) applying a digital fingerprint to the pixel columns 72,72',72", etc., the digital fingerprint including at least one of the following items of information: (i) the quantity of black pixels in the respective pixel column; (ii) a coordinate position of the black pixels in the respective pixel column; (iii) the quantity of white pixels in the respective pixel column; (iv) a coordinate position of the white pixels in the respective pixel column; (v) the quantity of pixels that are neither black nor white in the respective pixel column; or (vi) a coordinate position of the pixels that are neither black nor white in the respective pixel column; (f) comparing the digital fingerprints of the pixel columns 72,72',72", etc. in adjacent image stripes to identify redundant pixel columns 72,72',72", etc.; and (g) compiling the images stripes, without the redundant pixel columns 72,72',72", etc., into the two-dimensional image file.

According to this rotary method, the image stripes are significantly narrower than the image stripes used by the sectional scanning method. In the sectional method, the width of the image stripes can be 100 pixels or greater. However, the width of the image stripes in the rotary method are preferably about 4 to about 20 pixels wide. Obtaining images stripes that are so narrow allows the two-dimensional image to be fabricated with minimal distortion occurring around any abrupt corners or edges on the object, such as when the object has a cross-sectional area that is generally rectangular or that of a Reuleaux triangle. However, this also results in a significant increase in the total number of image stripes that are obtained, and a different method is required to handle the processing of these image stripes into a high-quality two-dimensional image.

The image stripes comprise, and are broken down into, a plurality of pixel columns 72,72',72", etc. Each pixel column 72 is a vertical slice of pixels within the image stripe 66. The pixel columns 72,72',72", etc. can have a width of one pixel or greater. Preferably, each pixel column is a single pixel wide. Next, the image stripes are arranged in an array to begin the processing steps. The array is essentially a blank canvas, such as a bitmap, upon which all of the image stripes are placed.

In a unique aspect hereof, a digital fingerprint is applied, or obtained, from each pixel column 72. The digital fingerprint can include any of the following information: (i) the quantity of black pixels in the respective pixel column; (ii) a coordinate position of the black pixels in the respective pixel column; (iii) the quantity of white pixels in the respective pixel column; (iv) a coordinate position of the white pixels in the respective pixel column; (v) the quantity of pixels that are neither black nor white in the respective pixel column; or (vi) a coordinate position of the pixels that are neither black nor white in the respective pixel column.

As referenced herein, a "black pixel" and "white pixel" have been pre-defined by a threshold setting within the software. The threshold setting can be determined by the user, the camera 26, generated automatically as a result of other parameters obtained by the camera 26 (e.g., overall lighting and contrast levels of the image), or the like. The coordinate position of each pixel can be established using any suitable type of coordinate system. Preferably the coordinate of each pixel is recorded having an "x" value which is the column position from the left, and a "y" value which is the row, or height position from the bottom. The coordinate can also optionally include an image stripe position, such as the position of the object at the time that the image stripe was obtained.

Next, the digital fingerprints of the pixel columns 72,72', 72", etc. in adjacent, or adjoining, image stripes are compared to identify redundant pixel columns 72,72',72", etc. The digital fingerprints of the pixel columns 72,72',72", etc. can also be compared with any of those pixel columns 72,72',72", etc. within a specified distance from each other. Because the image stripes are so narrow, the camera 26 obtains a new image stripe from the object extremely rapidly. Preferably, a new image stripe is obtained about every 50 milliseconds. A byproduct of this rapid process is that image stripes obtained in proximity to each other can include duplicate pixel columns 72,72',72", etc. where an overlapping has occurred. When this happens, these overlapping, or redundant pixel columns 72,72',72", etc. are eliminated, thus leaving only one instance of that particular pixel column.

Because this is a process that requires a fairly significant amount of the computer's resources, it is preferable that initially only the quantities of black pixels, white pixels, and/or pixels that are neither black nor white are compared. If the quantities of these pixels are substantially the same from one pixel column to another, the coordinates of the black, white, and/or non-black and non-white pixels can be compared as a secondary test.

Finally, the image stripes 66 (minus those redundant pixel columns 72,72',72", etc.) are compiled into a final two-dimensional image file.

In yet another aspect hereof, there is disclosed another rotary method for acquiring a two-dimensional image file of a three-dimensional object including the steps of: (a) providing the camera 26 for obtaining images of the object; (b) rotating the object; (c) obtaining a plurality of image stripes of the object by the camera 26 as the object rotates, the image stripes comprising a plurality of pixel columns 72,72',72", etc.; (d) arranging the image stripes in an array; (e) deleting any duplicate image stripes; and (f) compiling the images stripes into the two-dimensional image file.

This particular rotary method is similar to the first one described above except that this method does not necessarily entail the step in which the digital fingerprints of the pixel columns 72,72',72", etc. are obtained and compared. Conversely, this method includes a step in which any duplicate image stripes are deleted. The image stripes are analyzed from one to the next to locate any duplicates. Any suitable method for performing this step can be used, including pixel comparisons or the like. Preferably, because these processes are occurring so rapidly, motion detection software and/or methods are used to compare one image stripe to the next.

Furthermore, the rotary method can also include both steps of comparing redundant image stripes and also obtaining the digital fingerprints and eliminating redundant pixel columns 72,72',72", etc.

Just as with the first sectional scanning method described above, the rotary methods can also include the steps of calculating the width of the object and determining the width of the image stripes based upon the width of the object. In addition, the various methods for determining the width of the object described above can be used with the rotary methods as well.

In addition, the rotary methods can also include the step described above for calculating the center of the object by determining the locations of the left and right edges of the object at at least two different rotational positions, and providing the visual indicator 70 alerting a user if the object is off-center.

There is also provided a method of applying a digital fingerprint to a pixel column in a digital image including the steps of: (a) assigning a unique "x" coordinate to the pixel column; and (b) quantifying the number of black pixels, white pixels, and pixels that are neither black nor white in the pixel column. This method also includes the steps of assigning a unique "y" coordinate to the black pixels, white pixels, and pixels that are neither black nor white in the pixel column. Any combination of the quantity of black pixels, quantity of white pixels, quantity of non-black and non-white pixels, location/coordinates of black pixels, location/coordinates of white pixels, and the location/coordinates of non-black and non-white pixels can be used to apply or designate the digital fingerprint to the pixel columns 72,72',72", etc. As discussed above, the "x" position can reference the "x" position within the entire array, or it can reference the "x" position within the image stripe and the position number/location of the image stripe with respect to the rotational position of the turntable 24.

In yet another aspect hereof, the invention includes a method of fabricating a second image of the object to be used for comparing and assist in processing of the two-dimensional image of the object. The second image includes a plurality of images of the object obtained while the object is being rotated, but the images comprising the second image are two-dimensional images (or slices) of the object at various rotational positions. The plurality of images are positioned adjacent each other and cropped into the second image, although it is worth noting that although they are positioned, or abutted, next to each other, they are not stitched together to form a single seamless two-dimensional image of the object. In the event that any text or information is not legible or machine-readable (such as for OCR processing) on the two-dimensional stitched image that is generated, the second image can be provided for verification purposes. If an issue occurs during the stitching step that renders text unreadable in the stitched two-dimensional image, then the second image can also be used to manually correct or verify data in the two-dimensional image since that image contains an unaltered rendering of the object.

To that end, OCR can optionally be performed on both the two-dimensional image and the second image and cross-checked with each other for additional verification and accuracy.

Although the invention has been discussed with respect to the medical field, and more specifically to the drug intake process, the device and methods described herein can be used with obtaining two-dimensional images of any suitable type of three-dimensional object, including beverage labels, and so forth.

As is apparent from the preceding, the present invention, the present invention provides a device and methods for obtaining two-dimensional images of three-dimensional objects, such as labels on prescription bottles and containers, as well as nutritional and drug labels on over-the-counter medicines and supplements.

What is claimed is:

1. A method for acquiring a two-dimensional image of a three-dimensional object including the steps of:
   (a) providing a camera for obtaining images of the object;
   (b) calculating the width of the object by determining the location of a left edge and a right edge of the object by analyzing pixels in a horizontal row of pixels across the image,
   the left edge being located by designating a first pixel known to be to the left of the object as a subject pixel, and designating a plurality of pixels positioned to the left of the subject pixel as reference pixels, comparing at least one pixel property of the subject pixel with the pixel property of the reference pixels, determining that the left edge of the image is not located at the subject pixel when the subject pixel and the reference pixel have the same pixel property, determining that the left edge of the image does begin at the subject pixel when the subject pixel and the reference pixels do not have the same pixel property, and when the subject pixel is determined as not being the left edge of the image, a second pixel to the right of the first pixel is then designated as the subject pixel, and the process of comparing the pixel property between the reference pixels and the subject pixel is repeated, wherein the process of comparing the pixel property and the subsequent re-designation of the subject pixel is repeated until the left edge of the image is located,
   the right edge being located by designating a first pixel known to be to the right of the object as a subject pixel, and designating a plurality of pixels positioned to the right of the subject pixel as reference pixels, comparing at least one pixel property of the subject pixel with the pixel property of the reference pixels, determining that the right edge of the image is not located at the subject pixel when the subject pixel and the reference pixel have the same pixel property, determining that the right edge of the image does begin at the subject pixel when the subject pixel and the reference pixels do not have the same pixel property, and when the subject pixel is determined as not being the right edge of the image, a second pixel to the left of the first pixel is then designated as the subject pixel, and the process of comparing the pixel property between the reference pixels and the subject pixel is repeated, wherein the process of comparing the pixel property and the subsequent re-designation of the subject pixel is repeated until the right edge of the image is located, and
   the width of the object is then determined once the left and right edges have been located;
   (c) determining the width of an image stripe based upon the width of the object, the width of the image stripe being less than the width of the object;
   (d) capturing a first image stripe of the object;
   (e) rotating the object to a second position;
   (f) capturing a second image stripe of the object; and
   (g) stitching together the first and second image stripes of the object to form the two-dimensional image.

2. The method of claim 1 including the steps of:
   (h) capturing a third image stripe of the object at a third rotational position;

(i) capturing a fourth image stripe of the object at a fourth rotational position; and (j) stitching third and fourth image stripes together along with the first and second image stripes to form the two-dimensional image.

3. The method of claim 1 wherein the object is rotated 30° from the first position to the second position.

4. The method of claim 1 in which the reference pixels include at least 10 pixels.

5. The method of claim 1 including the step of calculating the center of the object using the known locations of the left and right edges, and providing a visual indicator alerting a user if the object is off-center from an axis of rotation upon which the objected was rotated.

6. The method of claim 5 wherein the visual indicator includes a green bar visually displaying the calculated width when the object is centered, a yellow bar visually displaying the calculated width when the object is marginally off-centered, and a red bar visually displaying the calculated width when the object is critically off-centered.

7. The method of claim 1 including the step of determining a left edge of the two-dimensional image either by using known pixel characteristics or by manual selection by a user.

8. A method for acquiring a two-dimensional image file of a three-dimensional object including the steps of:

(a) providing a camera for obtaining images of the object;

(b) rotating the object;

(c) obtaining a plurality of image stripes of the object by the camera as the object rotates, the image stripes comprising a plurality of pixel columns;

(d) arranging the image stripes in an array;

(e) applying a digital fingerprint to the pixel columns, the digital fingerprint including at least one of the following items of information:

(i) the quantity of black pixels in the respective pixel column;

(ii) the quantity of white pixels in the respective pixel column; or (iii) the quantity of pixels that are neither black nor white in the respective pixel column;

(f) comparing the digital fingerprints of the pixel columns in adjacent image stripes to identify redundant pixel columns;

(g) compiling the images stripes, without the redundant pixel columns, into the two-dimensional image file: and (h) calculating the width of the object; and determining the width of the image stripes based upon the width of the object, the width of the object being calculated by determining the location of a left edge and a right edge of the object, the left edge being located by comparing the contrast level of pixels in a first plurality of pixels in a row from left to right until a pixel is located having a contrast level that is different than that of the pixels already compared in the first plurality of pixels, and the right edge is located by comparing the contrast level of pixels in a second plurality of pixels in a row from right to left until a pixel is located having a contrast level that is different than that of the pixels already compared in the second plurality of pixels, the first and second pluralities of pixels each having a length along their row that is less than the width of the two-dimensional image file, and the width of the object being calculated as a distance between the left edge and the right edge.

9. The method of claim 8 wherein the width of each of the image stripes is about 4 to about 20 pixels wide.

10. The method of claim 9 including, after the step of arranging the image stripes in an array, the step of deleting any duplicate image stripes.

11. The method of claim 8 in which the first and second pluralities of pixels each comprise at least 10 pixels in a row.

12. The method of claim 8 including the step of calculating the center of the object at at least two different rotational positions by determining the locations of the left and right edges of the object at the different rotational positions, determining if the center of the object is at the same location for each rotational position, and providing a visual indicator alerting a user if the center of the object is not at the same location for each rotational position.

13. The method of claim 10 including the steps of: calculating the width of the object; and determining the width of the image stripes based upon the width of the object.

14. The method of claim 12 wherein the visual indicator includes a green bar visually displaying the calculated width when the object is centered, a yellow bar visually displaying the calculated width when the object is marginally off-centered, and a red bar visually displaying the calculated width when the object is critically off-centered.

15. The method of claim 8 in which the width of the object is calculated by determining the location of a left edge and a right edge of the object by analyzing pixels in a horizontal row of pixels across the image, the left edge being located by designating a first pixel known to be to the left of the object as a subject pixel, and designating a plurality of pixels positioned to the left of the subject pixel as reference pixels, comparing at least one pixel property of the subject pixel with the pixel property of the reference pixels, determining that the left edge of the image is not located at the subject pixel when the subject pixel and the reference pixel have the same pixel property, determining that the left edge of the image does begin at the subject pixel when the subject pixel and the reference pixels do not have the same pixel property, and when the subject pixel is determined as not being the left edge of the image, a second pixel to the right of the first pixel is then designated as the subject pixel, and the process of comparing the pixel property between the reference pixels and the subject pixel is repeated, wherein the process of comparing the pixel property and the subsequent re-designation of the subject pixel is repeated until the left edge of the image is located, the right edge being located by designating a first pixel known to be to the right of the object as a subject pixel, and designating a plurality of pixels positioned to the right of the subject pixel as reference pixels, comparing at least one pixel property of the subject pixel with the pixel property of the reference pixels, determining that the right edge of the image is not located at the subject pixel when the subject pixel and the reference pixel have the same pixel property, determining that the right edge of the image does begin at the subject pixel when the subject pixel and the reference pixels do not have the same pixel property, and when the subject pixel is determined as not being the right edge of the image, a second pixel to the left of the first pixel is then designated as the subject pixel, and the process of comparing the pixel property between the reference pixels and the subject pixel is repeated, wherein the process of comparing the pixel property and the subsequent re-designation of the subject pixel is repeated until the right edge of the image is located, and the width of the object is then determined once the left and right edges have been located.

16. The method of claim 15 in which the reference pixels include at least 10 pixels.

\* \* \* \* \*